US009626261B2

(12) United States Patent
Ren et al.

(10) Patent No.: US 9,626,261 B2
(45) Date of Patent: Apr. 18, 2017

(54) FAILURE RECOVERY RESOLUTION IN TRANSPLANTING HIGH PERFORMANCE DATA INTENSIVE ALGORITHMS FROM CLUSTER TO CLOUD

(71) Applicant: Futurewei Technologies, Inc., Plano, TX (US)

(72) Inventors: Da Qi Ren, Santa Clara, CA (US); Zhulin Wei, Santa Clara, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 142 days.

(21) Appl. No.: 14/555,285

(22) Filed: Nov. 26, 2014

(65) Prior Publication Data
US 2015/0149814 A1 May 28, 2015

Related U.S. Application Data

(60) Provisional application No. 61/910,018, filed on Nov. 27, 2013.

(51) Int. Cl.
| | |
|---|---|
| *G06F 11/20* | (2006.01) |
| *G06F 11/14* | (2006.01) |
| *H04L 29/08* | (2006.01) |
| *G06F 11/07* | (2006.01) |
| *H04L 12/26* | (2006.01) |

(52) U.S. Cl.
CPC ...... *G06F 11/2028* (2013.01); *G06F 11/0703* (2013.01); *G06F 11/1438* (2013.01); *G06F 11/1448* (2013.01); *G06F 11/1484* (2013.01); *H04L 67/1002* (2013.01); *H04L 67/1095* (2013.01); *G06F 11/203* (2013.01); *G06F 2201/84* (2013.01); *G06F 2201/85* (2013.01); *H04L 43/10* (2013.01)

(58) Field of Classification Search
CPC .. G06F 11/2028; G06F 11/0751; G06F 9/546; G06F 2209/547; G06F 8/457; H04L 41/04
See application file for complete search history.

(56) References Cited

U.S. PATENT DOCUMENTS

| | | | | |
|---|---|---|---|---|
| 5,959,969 A | * | 9/1999 | Croslin | ............... H04Q 3/0079 370/216 |
| 6,539,542 B1 | * | 3/2003 | Cousins | ................. G06F 8/457 717/143 |
| 6,782,537 B1 | * | 8/2004 | Blackmore | ............ G06F 9/524 718/106 |

(Continued)

FOREIGN PATENT DOCUMENTS

| | | |
|---|---|---|
| CN | 1719831 A | 1/2006 |
| CN | 101369241 A | 2/2009 |

*Primary Examiner* — Loan L.T. Truong
(74) *Attorney, Agent, or Firm* — Futurewei Technologies, Inc.

(57) ABSTRACT

A method of providing failure recovery capabilities to a cloud environment for scientific HPC applications. An HPC application with MPI implementation extends the class of MPI programs to embed the HPC application with various degrees of fault tolerance. An MPI fault tolerance mechanism realizes a recover-and-continue solution. If an error occurs, only failed processes re-spawn, the remaining living processes remain in their original processors/nodes, and system recovery costs are thus minimized.

19 Claims, 6 Drawing Sheets

(56) References Cited

U.S. PATENT DOCUMENTS

| | | | |
|---|---|---|---|
| 6,865,591 B1* | 3/2005 | Garg | G06F 11/1482 709/201 |
| 7,941,479 B2 | 5/2011 | Howard et al. | |
| 8,676,760 B2* | 3/2014 | Shen | G06F 11/2028 707/640 |
| 9,286,261 B1* | 3/2016 | Tzelnic | G06F 15/167 |
| 9,348,661 B2* | 5/2016 | Archer | G06F 9/54 |
| 2003/0187915 A1* | 10/2003 | Sun | H04L 29/06 709/201 |
| 2004/0172626 A1* | 9/2004 | Jalan | G06F 8/458 717/149 |
| 2006/0117212 A1* | 6/2006 | Meyer | G06F 3/0605 714/4.11 |
| 2007/0025351 A1* | 2/2007 | Cohen | G06F 9/542 370/390 |
| 2007/0288935 A1* | 12/2007 | Tannenbaum | G06F 9/5072 719/319 |
| 2008/0273457 A1* | 11/2008 | Sun | G06F 9/4856 370/221 |
| 2009/0006810 A1* | 1/2009 | Almasi | G06F 9/54 712/35 |
| 2009/0037998 A1* | 2/2009 | Adhya | G06Q 20/027 726/11 |
| 2009/0043988 A1* | 2/2009 | Archer | G06F 9/5061 712/31 |
| 2010/0023723 A1* | 1/2010 | Archer | G06F 12/10 711/170 |
| 2010/0099426 A1* | 4/2010 | Lozinski | H04L 41/0677 455/450 |
| 2010/0122268 A1* | 5/2010 | Jia | G06F 9/546 719/314 |
| 2010/0228760 A1* | 9/2010 | Chen | G06F 17/30445 707/759 |
| 2011/0099420 A1* | 4/2011 | MacDonald McAlister | G06F 11/2025 714/6.32 |
| 2012/0036208 A1* | 2/2012 | Beisel | H04L 12/1895 709/206 |
| 2012/0079490 A1* | 3/2012 | Bond | G06F 9/5038 718/103 |
| 2012/0089968 A1* | 4/2012 | Varadarajan | G06F 9/5033 717/136 |
| 2012/0124430 A1* | 5/2012 | Dharmasanam | H04L 12/12 714/48 |
| 2012/0159236 A1 | 6/2012 | Kaminsky | |
| 2012/0226943 A1* | 9/2012 | Alderman | G06F 11/0751 714/37 |
| 2013/0073743 A1* | 3/2013 | Ramasamy | H04L 67/1027 709/238 |
| 2013/0159364 A1* | 6/2013 | Grider | G06F 17/30224 707/826 |
| 2013/0159487 A1* | 6/2013 | Patel | H04L 67/1031 709/223 |
| 2013/0238785 A1 | 9/2013 | Hawk et al. | |
| 2013/0311543 A1 | 11/2013 | Howard | |
| 2014/0056121 A1* | 2/2014 | Johnsen | H04L 41/0654 370/216 |
| 2014/0278623 A1* | 9/2014 | Martinez | G06Q 10/06 705/7.12 |
| 2014/0337843 A1* | 11/2014 | Delamare | H04B 3/542 718/1 |
| 2015/0106820 A1* | 4/2015 | Lakshman | G06F 9/5011 718/104 |
| 2015/0256484 A1* | 9/2015 | Cameron | G06F 9/3004 709/226 |
| 2015/0379864 A1* | 12/2015 | Janchookiat | H04L 41/0631 340/511 |
| 2016/0055045 A1* | 2/2016 | Souza | G06F 11/0712 714/57 |

* cited by examiner

| Algorithm: MPI setup RPC call |
|---|

/*MPI initialization communicator group */
1. MPI_INIT; MPI_COMM_WORLD=nprocs;
   /*MPI process to Create communicators */
2. MPI_COMM_SIZE(MPI_COMM_WORLD, &mpi_size);
3. MPI_Gather (IP Address, machines);
   /*Gther node informations */
   /*Create parameter table using information from MPI */
   /* Performs RPC call to the target machine in Hadoop Cluster */
4. FOR (size_t; i=1; i<nprocs; i++) {
5.     LISTEN ();
6.     }
7. FOR (size_t; i=0; i<nprocs; i++) {
8.     Connect (i);
9.     }
   /* Establish TCP connection with RPC;
10. In_thread_num = machine_num/proc_per_thread;
11. Out_thread_num = machine_num/proc_per_thread;
    /* Create TCP long connections over the virtual
    machines identified by MPI communicators */
    /* Run distributed computing over the TCP connection */

FIG. 3

| | Algorithm: MPI error handler setup, the main function |
|---|---|
| 1. | int i, myrank, ini_size, curr_size; |
| 2. | MPI_Comm worker_comm [MAX_WORKERS]; |
| 3. | MPI_Comm_rank (MPI_COMM_WORLD, |
| 4. | &myrank); |
| 5. | MPI_Comm_size (MPI_COMM_WORLD, &ini_size); |
| 6. | curr_size = ini_size; |
| 7. | /* create intercommunicators, set error handlers*/ |
| 8. | for (i = 1; i<curr_size; ++i) |
| 9. | { |
| 10. | MPI_Intercomm_Create (MPI_COMM_SELF, 0, |
| 11. | MPI_COMM_WORLD, i, |
| 12. | IC_CREATE_TAG, &worker_ comm[i-1] |
| 13. | ); |
| 14. | MPI_Comm_Set_Errhandler (worker_comm[i-1], |
| 15. | MPI_ERRORS_RETURN ); |
| 16. | } |
| 17. | If (TCP application) { |
| 18. | Don't do anything if the application is TCP based; */ |
| 19. | } |
| 20. | If (MPI Application){ |
| 21. | manage MPI higher level fault tolerant mechanisms |
| 22. | } |
| 23. | For (i = 1; i<curr_size; ++i) { |
| 24. | MPI_Comm_free (& worker_comm[i-1]); |
| 25. | MPI_Finalize ( ); |
| 26. | } |

FIG. 5

| Algorithm: MPI spawn new communicators |
|---|

```
1.   MPI_Comm Cgr = MPI_COMM_WORLD;
2.   int get_current_state() {
3.   MPI_RANK_info irs;
4.   int deadnode=0;
5.   for (n = 0; n<curr_size; ++n) {
6.        /* Try to validate the status of each MPI rank,
7.        find out who is dead, and how many new nodes
8.        are needed;*/
9.        MPI_Comm_validate_rank (Cgr, n, rs);
10.       If (MPI_RANK_OK!=rs.state){
11.       return n;
12.       deadnode++; }
13.  }
14.  int NUM_SPAWNS=deadnode;
15.  int errcodes[NUM_SPAWNS];
16.  MPI_Comm parentcomm, intercomm;
17.  MPI_Comm_get_parent (&parentcomm);
18.  if (parentcomm==Cgr) {
19.       MPI_Comm_spawn ("Exe",
20.                 MPI_ARGV_NULL,
21.                 np, MPI_INFO_NULL, 0,
22.                 MPI_COMM_WORLD,
23.                 &intercomm, errcodes);
24.  return n;
25.  }
```

FIG. 6

FAILURE RECOVERY RESOLUTION IN TRANSPLANTING HIGH PERFORMANCE DATA INTENSIVE ALGORITHMS FROM CLUSTER TO CLOUD

PRIORITY CLAIM

This application claims priority of U.S. Provisional Patent Application Ser. No. 61/910,018 filed Nov. 27, 2013 entitled A FAILURE RECOVERY RESOLUTION IN TRANSPLANTING HIGH PERFORMANCE DATA INTENSIVE ALGORITHMS FROM CLUSTER TO CLOUD, the teaching of which are incorporated herein by reference in its entirety.

TECHNICAL FIELD

The present disclosure is generally directed to high performance computing (HPC) and cloud computing, and more specifically to fault tolerance to provide reliability of virtual clusters on clouds where high-performance and data-intensive computing paradigms are deployed.

BACKGROUND

High-performance computing (HPC) provides accurate and rapid solutions for scientific and engineering problems based on powerful computing engines and the highly parallelized management of computing resources. Cloud computing as a technology and paradigm for the new HPC era is set to become one of the mainstream choices for high-performance computing customers and service providers. The cloud offers end users a variety of services covering the entire computing stack of hardware, software, and applications. Charges can be levied on a pay-per-use basis, and technicians can scale their computing infrastructures up or down in line with application requirements and budgets. Cloud computing technologies provide easy access to distributed infrastructures and enable customized execution environments to be easily established. The computing cloud allows users to immediately access required resources without capacity planning and freely release resources that are no longer needed.

Each cloud can support HPC with virtualized Infrastructure as a Service (IaaS). IaaS is managed by a cloud provider that enables external customers to deploy and execute applications. FIG. 1 shows the layer correspondences between cluster computing and cloud computing models. The main challenges facing HPC-based clouds are cloud interconnection speeds and the noise of virtualized operating systems. Technical problems include system virtualization, task submission, cloud data input/output (I/O), security and reliability. HPC applications require considerable computing power, high performance interconnections, and rapid connectivity for storage or file systems, such as supercomputers that commonly use InfiniBand and proprietary interconnections. However, most clouds are built around heterogeneous distributed systems connected by low performance interconnection mechanisms, such as O-Gigabit Ethernet, which do not offer optimal environments for HPC applications. Table 1 below shows the comparison of technical characters between cluster computing and cloud computing models. Differences in infrastructures between cluster computing and cloud computing have increased the need to develop and deploy fault tolerance solutions on cloud computers.

|  | Cloud Computing | Cluster Computing |
| --- | --- | --- |
| Performance factors | 1. Computation cost<br>2. Storage cost<br>3. Data transfer cOSI (in or out for each service) | I. Computation cost<br>2. Communication latencies<br>3. Datu dependencies<br>4. Synchronization |
| Performance Tuning | I. Specifying a particular service for a particular task;<br>2. Archiving intermediate dura on a particular storage device;<br>3. Choosing a set of locations for input and output data. | 1. Dcfining the data size to be distributed<br>2. Scheduling the send nnd receive workload<br>3. Task synchronization |
| Fault Tolerance | 1. Rcseud<br>2. Reroute<br>3. graph scheduling<br>4. QoS | J. Checkpointing protocols<br>2. Membership protocol<br>3. systelJl synchronization |
| Goal | Minimizing the total cost of execution while meeting all the user-specified constraints. | Minimizing the total exeecution lime; performing on users' hardware platforms, |
| Reliability | No | Yes |
| Task size | Single large | Small and medium |
| Scalable | No | Yes |
| Switching | Low | High |
| Application | HPC, HTC | SME interactive |

SUMMARY

This disclosure is directed to a failure recovery solution for transplanting high-performance data-intensive algorithms from the cluster to the cloud.

According to one example embodiment, a method provides failure recovery capabilities to a cloud environment for scientific HPC applications. An HPC application with MPI implementation extends the class of MPI programs to embed the HPC application with various degrees of fault tolerance (FT). An MPI FT mechanism realizes a recover-and-continue solution; if an error occurs, only failed processes re-spawn, the remaining living processes remain in their original processors/nodes, and system recovery costs are thus minimized.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 3 illustrates pseudo-code of an algorithm setting up a TCP connection using MPI initialization;

FIG. 5 illustrates pseudo-code of an algorithm for MPI error handler setup, and the main function;

FIG. 6 illustrates pseudo-code for MPI spawning new communications; and

DETAILED DESCRIPTION

Failure Model for HPC on Cloud

An HPC cloud platform provides a comprehensive set of integrated cloud management capabilities to meet users' HPC requirements. Deployed on top of a HPC cloud, the software manages the running of computing and data-intensive distributed applications on a scalable shared grid, and accelerates parallel applications to accelerate results and improve the utilization of available resources. An HPC cloud enables the self-service creation and management of multiple flexible clusters to deliver the performance required by computing-intensive workloads in multi-tenant HPC environments. This disclosure provides a failure recovery solution using a typical Message Passing Interface-Transmission Control Protocol (MPI-TCP) model.

HPC Fault Tolerant Model on Cloud

MPI provides a message-passing application programmer interface and supports both point-to-point and collective communication. MPI has remained the dominant model used for HPC for several decades due to its high performance, scalability, and portability.

Many of the current big data applications use Remote Procedure Call (RPC) to establish TCP connections for high-performance data intensive computing. Typical examples, such as MapReduce and Pregel, require long TCP connections to build up virtual cluster networks over the Internet or cloud. Hadoop RPC forms the primary communication mechanism between the nodes in the Hadoop cluster. The Hadoop Distributed File System (HDFS) enables multiple machines to implement functions. Hadoop NameNode receives requests from HDFS clients in the form of Hadoop RPC requests over a TCP connection. The listener object listens to the TCP port that serves RPC requests from the client.

In comparison, GraphLab simultaneously uses MPJ (MPI for Java) and TCP, and simplifies the update process because users do not need to explicitly define the information flow from Map to Reduce and can just modify data in-place. For iterative computations, Graphlab's knowledge of the dependency structure directly communicates modified data to the destination. GraphLab presents a simpler API and data graph to programmers, and informs GraphLab of the program's communication needs. This implementation model uses collective synchronous MPJ operations for communication.

Figure 1:
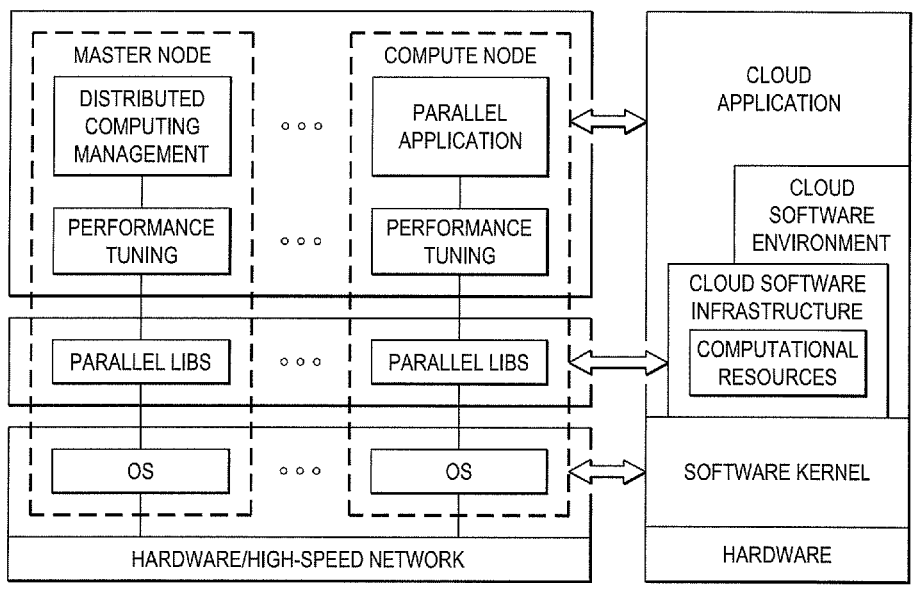
FIG. 1 illustrates layer correspondences between cluster computing and cloud computing.
Figure 2:
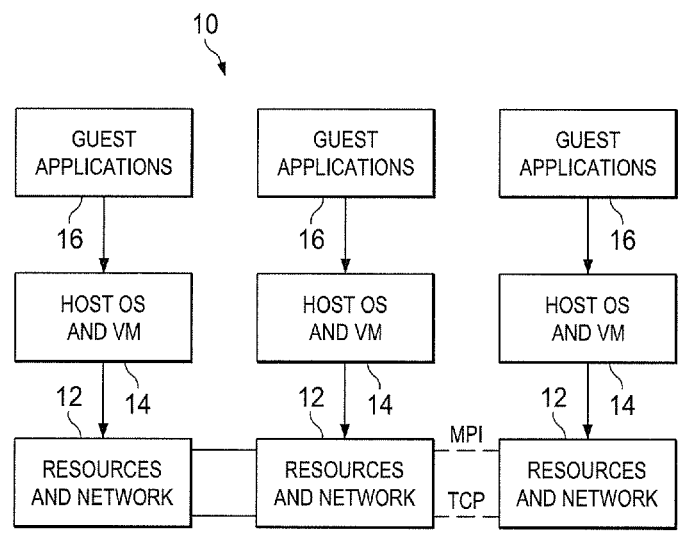
FIG. 2 illustrates three IaaS layers forming network resources from bottom to top: cloud resources and TCP networks; hosts and virtual machines; guest MPI applications.

Based on the applications listed above, this disclosure provides a modeled three-layer IaaS networked computing platform as shown at 10 in FIG. 2, which, from bottom to top, are: cloud resources and TCP networks 12; hosts and virtual machines (VMs) 14; and guest MPI applications 16 (all collectively referred to herein as network resources). The cloud provider is responsible for administering services and cloud resources, such as hardware and VMs, that customers use to deploy and execute applications. FIG. 2 summarizes the vertical cloud architecture and the scope of each cloud participant of the network resources. This disclosure identifies three types of failure of the network resources in the cloud platform: hardware/network failure, virtual machine failure, and application failure. Each of the above layers has exclusive fault tolerant functions; however, for optimal performance, collaborative failure management approaches including best effort must be considered.

Failure Detection

At the application level 16, MPI fault tolerance or virtual machine sensors can detect an application or virtual machine failure. Both the application layers 16 and virtual machine layers 14 collaborate to precisely locate errors. Errors can have three origins: MPI application, the virtual machine, and TCP network/hardware.

At the network/hardware level 12, TCP connections can be long-term as certain users maintain connections for hours or even days at a time. The duration of TCP connections provides an excellent parallel platform for a group of virtual machines to run like a cluster on a cloud. If a problem occurs, heartbeating can check whether the network connection is alive because a connected network periodically sends small packets of data (heartbeats). If the peer does not receive a heartbeat for a specified time period, the connection is considered broken. However, the TCP protocol does not provide heartbeats and TCP endpoints are not notified of broken connections, causing them to live indefinitely, forever trying to communicate with the inaccessible peer. Higher level applications must then reinitialize certain applications. For many scientific computing applications, especially those with high-availability requirements, this missing failure notification is a critical issue that urgently requires a recovery mechanism.

Failure Recovery

If an error originates from the program at the application layer 16, the program itself should be able to self-recover e.g. the map-reduce implementation replicates data on the HDFS. If a node fails, tasks that are using the data on the failed node can restart on another node that hosts a replica of the data.

If an error occurs on a virtual machine due to a hardware host failure in layer 14, the cloud administration starts a new virtual machine with the same features, allowing users to redeploy tasks and restart and synchronize the new machine. In line with an application's properties, the checkpointing and recovery process is required after a new virtual machine is generated. The checkpointing process periodically takes system snapshots and stores application status information in persistent storage units. If a failure occurs, the most recent status can be retrieved and the system recovered. User directed checkpointing requires the application programmer to form the checkpoint and write out any data needed to restart the application. Checkpoints must be saved to persistent storage units, which are typically cloud-based, that will not be affected by the failure of a computing element. However, there are two disadvantages in this scenario: first, the user is responsible for ensuring that all data is saved; second, the checkpoints must be taken at particular points in the program.

MPI/TCP Infrastructure when Severing High Performance Data-Intensive Computing on Cloud This disclosure provides a method to add failure recovery capabilities to a cloud environment for scientific HPC applications. An HPC application with MPI implementation is able to extend the class of MPI programs to embed the HPC application with various degrees of fault tolerance (FT). An MPI FT mechanism realizes a recover-and-continue solution; if an error occurs, only failed processes re-spawn, the remaining living processes remain in their original processors/nodes, and system recovery costs are thus minimized.

MPI and TCP

Users can initialize a low-level MPI/TCP communication model by enabling the communication group to use the MPI COMM to collect distributed system data, and then deliver it to the RPC to create a long-term TCP connection. Executing a distributed application over TCP connections and on a virtual cluster involves a similar process that requires three steps: 1) Initialize communicator groups using MPI; 2) Pass the data to RPC; 3) All devices with TCP connections complete connection setup and enter the established state. TCP software can then operate normally. FIG. 3 shows pseudo-code for the steps of setting up a TCP connection using MPI initialization. The pseudo-code describes how MPI and TCP jointly build a Hadoop cluster.

Fault Tolerant MPI Semantics and Interfaces

The MPI Forum's Fault Tolerance Working Group has defined a set of semantics and interfaces to enable fault tolerant applications and libraries to be portably constructed on top of the MPI interface, which enables applications to continue running and using MPI if one or multiple processes in the MPI universe fail. This disclosure assumes that MPI implementation provides the application with a view of the failure detector that is both accurate and complete. The application is notified of a process failure when it attempts to communicate either directly or indirectly with the failed process using the function's return code and error handler set on the associated communicator. The application must explicitly change the error handler to MPI_ERRORS_RETURN on all communicators involved in fault handling on the application.

MPI Recovery Procedure

Figure 4:
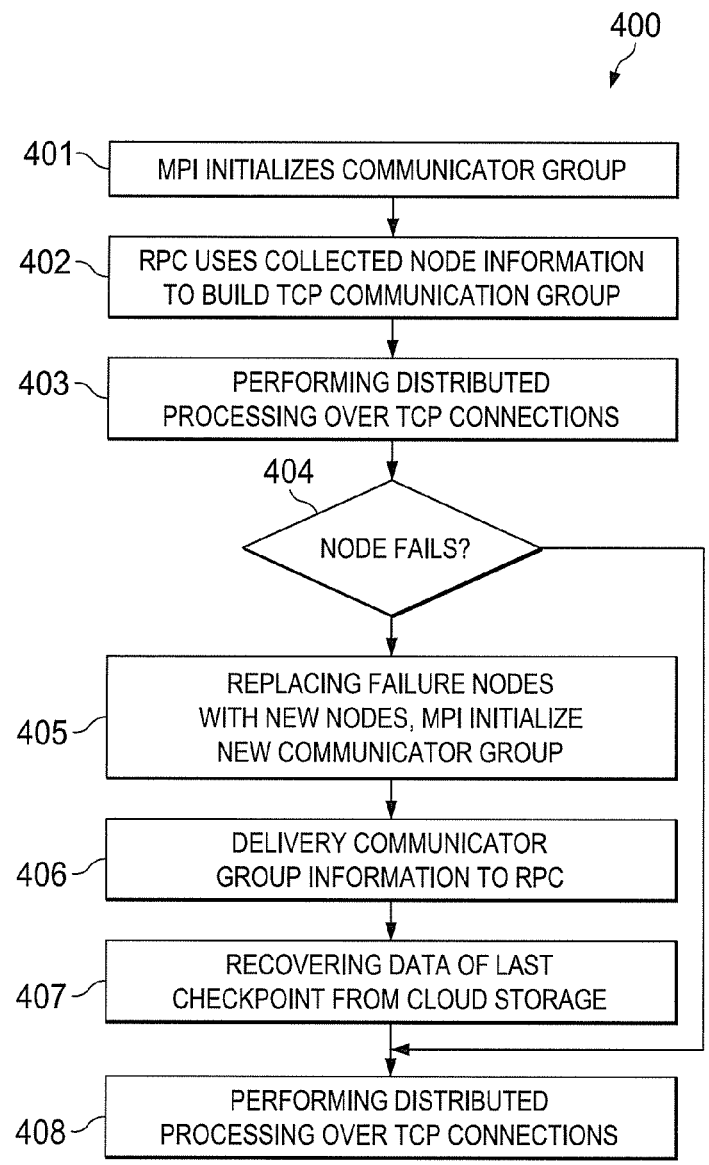
FIG. 4 shows the component launch and monitoring steps and automated recovery flow process.

To minimize the impact of the failure recovery process on an MPI/TCP task running on a cloud infrastructure, this disclosure provides a component that automates the launch and monitoring processes, periodically checks MPI health, and stops and re-launches the MPI/TCP process if a failure is detected. The component implements the following launch and monitoring steps and automated recovery flow process 400 as shown in FIG. 4.

Step 401. The MPI_INIT pings and establishes connections with each virtual machine, builds a communication group comprising all communicators, and ensures that the communicators are up and available.

Step 402. The MPI process sends the size n node numbers, node names, folder path in which the MPI process will run, and file names with application instructions.

Step 403. RPC initializes independent, long-term TCP connections.

Step 404. Parallel execution enables each node to deploy multiple threads. Anode is deemed to have failed if a virtual machine is in down status. MPI implementation must be able to return an error code if a communication failure such as an aborted process or failed network link occurs.

Step 405. The management process uses MPI_Comm_Spawn to create workers and return an intercommunicator. This simplifies intercommunication formation in the scenario of parallel workers because one MPI_Comm_Spawn command can create multiple workers in a single intercommunicator's remote group. MPI_Comm_Spawn replaces dead workers, and continues processing with no fewer workers than before.

Step 406. A parallel worker's processes can inter-communicate using an ordinary intercommunicator, enabling collective operations. Fault tolerance resides in the overall manager/worker structure.

Step 407. The MPI process sends the size n node numbers node names, folder path in which the MPI process will run, and file names with application instructions. RPC initializes independent, long-term TCP connections. Checkpoints are copied from cloud storage.

Step 408. Parallel execution enables each virtual machine (VM) to deploy multiple threads. Note that the component is independent of any particular MPI application.

Fault Tolerance Implementation

Focusing on communication-level fault tolerance issues, FIG. 5 and FIG. 6 illustrate an example of a common scenario based on a well-known master/worker communication program. The scenario covers program control management failure detection and termination detection. FIG. 5 illustrates the general procedure for setting up a fault tolerance MPI/TCP working environment using inter-communicators and MPI ERROR Handlers. FIG. 6 shows how MPJ responds by spawning new nodes and removing dead nodes when a failure occurs.

FIGS. 7A-7D shows a diagram of the MPI/TCP failure recovery process.

Figure 7A:
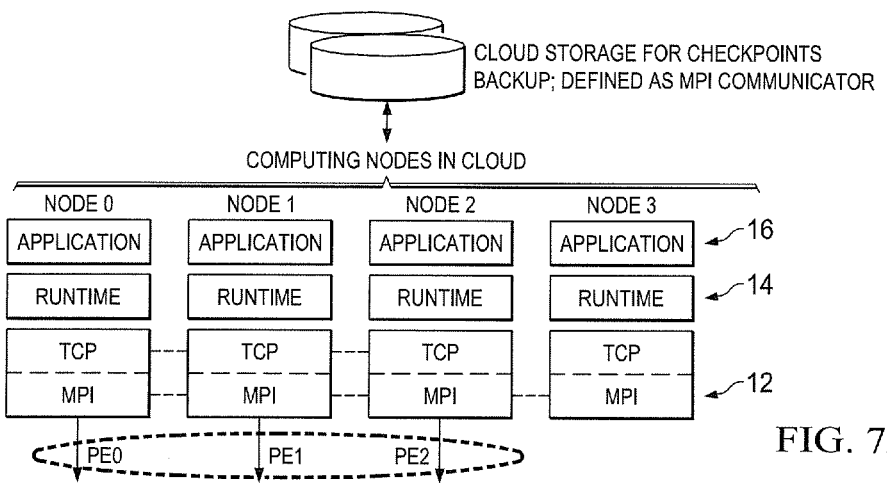
FIG. 7A-7D illustrates a MPI/TCP failure recovery process establishing new TCP long connections.

FIG. 7A illustrates a set of virtual machines running in parallel.

Figure 7B:
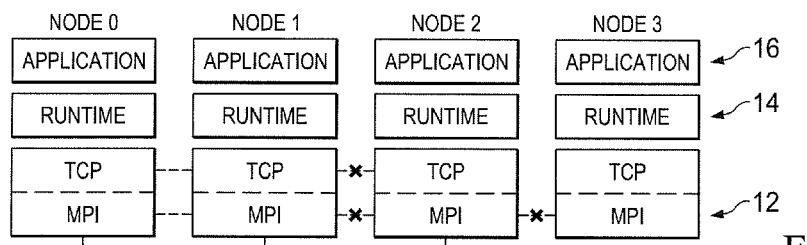

FIG. 7B illustrates Node 2 fails.

Figure 7C:
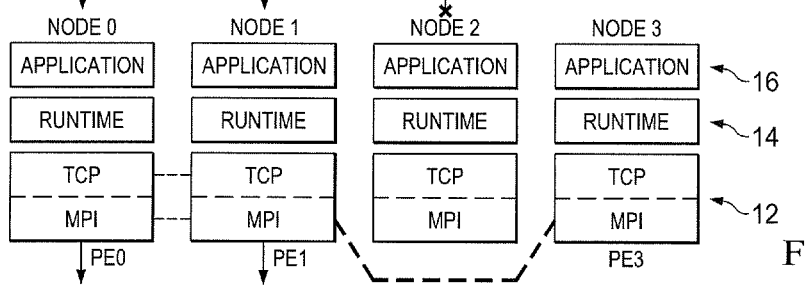

FIG. 7C illustrates MPI locating a new node 3.

Figure 7D:
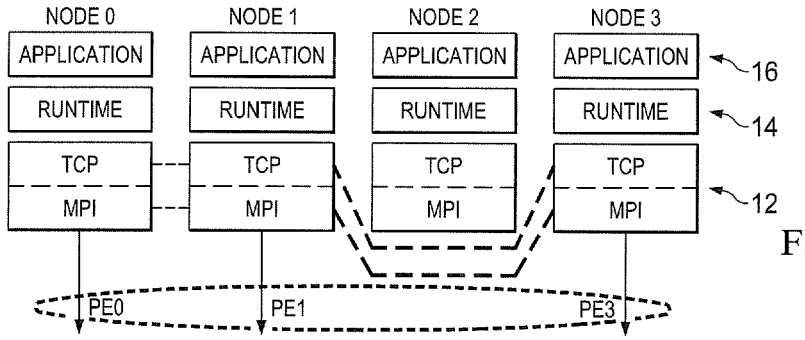

FIG. 7D illustrates establishing a new TCP long connection.

TCP Recovery

After the MPI connection is recovered, an RPC procedure is initialized. A client node calls its client stub using parameters pushed to the stack. The client stub packs these parameters into a message, and makes a system call to send the message from the client machine to the server machine. The operating system on the server machine passes the incoming packets to the server stub, and the server stub unpacks the parameters from the message. The server stub calls the server procedure, which forms the basis of establishing the TCP connection.

Higher Level Applications

An HPC-based cloud example is the design of a distributed master/worker finite element method (FEM) computing process. The FEM process involves mesh generation, refinement, and matrix assembly. The uncertainty of mesh refinement complicates the following operations: distributing basic functional modules that incorporate message synchronization, distributing matrices' data, and collecting data; however, a MapReduce HDFS can maintain the consistency of FEM meshes in a distributed environment. Assuming that the computing capability of each node in a cloud is identical, the process for solving this problem is to map all tasks to a set of cloud mesh data. An independent task assigned to a worker process has a well-defined life cycle: First, the master sends a task to a worker, which the worker takes and works on; second, the worker returns the results after completing the task.

The fault tolerant scheme collaborates with checkpoint/restart techniques to handle failures during distributed processing. At least three lists task lists must be created: (1) Waiting (2) In progress (3) Done. The manager-part program should mark an intercommunicator as dead when a send or receive operation fails, maintain the task in-progress list, and send the operation to the next free worker. Global performance tuning optimization can be constructed from the timing and fault tolerant modes to identify the global minimum execution time for correct computing results.

While this disclosure has described certain embodiments and generally associated methods, alterations and permutations of these embodiments and methods will be apparent to those skilled in the art. Accordingly, the above description of example embodiments does not define or constrain this disclosure.

Other changes, substitutions, and alterations are also possible without departing from the spirit and scope of this disclosure, as defined by the following claims.

What is claimed is:

1. A computing node for performing fault tolerance at an infrastructure as a service (IaaS) layer on a cloud computing platform having network resources, comprising:
    a component, including a processor, collecting system distributed data of the cloud computing platform using a message passing interface (MPI);
    the component establishing long-term transmission control protocol (TCP) interconnections of the cloud computing platform using a remote procedure call (RPC);
    the component automatically detecting a failure of one of the network resources in a cluster of the network resources including a plurality of MPI nodes in an MPI communication group, the MPI communication group including MPI communicators;
    the component recovering the failure by adding a new network resource in place of the failed network resource using combined MPI and RPC functionalities and reinitializing the MPI communication group to include the new network resource determined as a new MPI communicator in the MPI communication group; and
    the component delivering information indicative of the new MPI communicator to the RPC.

2. The computing node as specified in claim 1, wherein detecting the failure in the cluster of the network resources comprises:
    the component calling the MPI nodes;
    the component delivering information indicative of a failed MPI node to a MPI master node in order to spawn the new network resource as a new MPI node; and
    the MPI master node broadcasting the information of the failed MPI node to all of the MPI nodes in the MPI communication group such that each MPI node is updated with the information.

3. The computing node as specified in claim 2, further comprising:
    the component determining the new MPI node as the new MPI communicator according to information at the MPI master node;
    the component establishing a new connection with RPC to the new MPI node;
    the component spawning the new MPI communicator on the new MPI node; and
    the component updating the new MPI communicator with group member information and parallel processing information.

4. A computing node as specified in claim 3, further comprising:
    the component establishing checkpoints during parallel processing periodically; and
    the component saving data of each checkpoint on a cloud storage.

5. The computing node as specified in claim 4, further comprising:
    the component updating the new MPI node with current checkpoint data from the cloud storage; and
    the component updating all of the MPI communication group members with the current checkpoint data from the cloud storage.

6. The computing node as specified in claim 4, wherein:
    the cloud storage has a definition in MPI; and
    the cloud storage is one of the MPI communication group members such that all of the MPI nodes recognize the cloud storage and can copy data to/from the cloud storage.

7. The computing node as specified in claim 2, further comprising:
    defining a threshold time T allowing the component to determine whether one of the MPI nodes has failed, wherein
    in response to the master MPI node determining no response from the MPI node, the master MPI node waits a time length of time T,
    the component does not spawn the new MPI node in response to the MPI node with no response is recovered and responds to the master MPI node within the time T, and
    the component spawns the new MPI node to replace the failed MPI node in response to the MPI node with no response not being recovered within time T.

8. The computing node as specified in claim 7 wherein a time T_opt represents a time to establish the new MPI node, spawn the new MPI node, update the new MPI node information, and update the new MPI node with checkpoint data, wherein:
    in response to T >T_opt, the component spawns the new MPI node to replace the failed MPI node before the time length of time T expires.

9. The computing node as specified in claim 8, wherein in response to T<=T_opt, the master MPI node waits until the time length of time T to decide if the non-responsive MPI node has failed.

10. A of computing node performing failure recovery in a parallel cloud high performance computing (HPC) system having nodes, comprising:
    a component, including a processor, establishing connections with a plurality of virtual machines (VMs) having communicators, and building a communication group that includes the communicators;
    an message passing interface (MPI) process sending node numbers, node names, a folder path on which a MPI process can run, and file names with application instructions;
    a remote procedure call (RPC) initializing independent, long-term transmission control protocol (TCP) connections;
    the MPI process returning an error code to the component in response to a communication failure occurring in one of the communicators;
    the component spawning a new communicator to replace the failed communicator in response to a failure in one of the communicators;

the RPC re-initializing independent, long-term TCP connections for the failed communicator; and the MPI process loading checkpoint data from storage and importing the checkpoint data to the new communicator.

11. A method of performing fault tolerance at an infrastructure as a service (IaaS) layer on a cloud computing platform having network resources, comprising:

collecting system distributed data of the cloud computing platform using a message passing interface (MPI);

establishing long-term transmission control protocol (TCP) interconnections of the cloud computing platform using a remote procedure call (RPC);

automatically detecting a failure of one of the network resources in a cluster of the network resources including a plurality of MPI nodes in an MPI communication group, the MPI communication group including MPI communicators;

recovering the failure by adding a new network resource in place of the failed network resource using combined MPI and RPC functionalities and reinitializing the MPI communication group to include the new network resource determined as a new MPI communicator in the MPI communication group; and delivering information indicative of the new MPI communicator to the RPC.

12. The method as specified in claim 11, detecting the failure in the cluster of the network resources comprises calling the MPI nodes;

delivering information indicative of a failed MPI node to a MPI master node in order to spawn the new network resource as a new MPI node; and broadcasting the information of the failed MPI node to all of the MPI nodes in the MPI communication group such that each MPI node is updated with the information.

13. The method as specified in claim 12, further comprising:

determining the new MPI node as the new MPI communicator according to information at the MPI master node;

establishing a new connection with RPC to the new MPI node;

spawning the new MPI communicator on the new MPI node; and updating the new communicator with group member information and parallel processing information.

14. The method as specified in claim 13, further comprising:

establishing checkpoints during parallel processing periodically; and saving data of each checkpoint on a cloud storage.

15. The method as specified in claim 14, further comprising:

updating the new MPI node with current checkpoint data from the cloud storage; and updating all of the MPI communication group members with the current checkpoint data from the cloud storage.

16. The method as specified in claim 14, wherein:

the cloud storage has a definition in MPI; and the cloud storage is one of the MPI communication group members such that all of the MPI nodes recognize the cloud storage and can copy data to/from the cloud storage.

17. The method as specified in claim 12, further comprising:

defining a threshold time T allowing the component to determine whether one of the MPI nodes has failed, wherein in response to the master MPI node determining no response from the MPI node, the master MPI node waits a time length of time T, the component does not spawn the new MPI node in response to the MPI node with no response is recovered and responds to the master MPI node within the time T, and the component spawns the new MPI node to replace the failed MPI node in response to the MPI node with no response not being recovered within time T.

18. The method as specified in claim 17 wherein a time T_opt represents a time to establish the new MPI node, spawn the new MPI node, update the new MPI node information, and update the new MPI node with checkpoint data, wherein:

in response to T >T_opt, the component spawns the new MPI node to replace the failed MPI node before the time length of time T expires.

19. The method as specified in claim 18, wherein in response to T<=T_opt, the master MPI node waits until the time length of time T to decide if the non-responsive MPI node has failed.

* * * * *